United States Patent [19]
Thaniyavarn

[11] Patent Number: 5,455,878
[45] Date of Patent: Oct. 3, 1995

[54] PROGRAMMABLE SIGNAL TIME DELAY DEVICE USING ELECTRO-OPTIC AND PASSIVE WAVEGUIDE CIRCUITS ON PLANAR SUBSTRATES

[75] Inventor: Suwat Thaniyavarn, Bellevue, Wash.

[73] Assignee: The Boeing Company, Seattle, Wash.

[21] Appl. No.: 290,201

[22] Filed: Aug. 15, 1994

[51] Int. Cl.[6] ......................................... G02B 6/26
[52] U.S. Cl. ................................ 385/16; 385/17; 385/20; 385/25
[58] Field of Search .................................. 385/16, 17, 20, 385/21, 24, 25, 52

[56] References Cited

U.S. PATENT DOCUMENTS

| | | | |
|---|---|---|---|
| 4,568,143 | 2/1986 | Yamada et al. | 385/21 |
| 4,630,883 | 12/1986 | Taylor et al. | 350/96.15 |
| 4,653,849 | 3/1987 | Boirat et al. | 385/17 |
| 4,653,850 | 3/1987 | Boirat et al. | 385/17 |
| 4,671,605 | 6/1987 | Soref | 385/17 X |
| 4,695,121 | 9/1987 | Mahapatra et al. | 350/96.12 |
| 4,696,059 | 9/1987 | MacDonald et al. | 455/600 |
| 4,764,738 | 8/1988 | Fried | 332/7.51 |
| 4,789,214 | 12/1988 | Vilhelmsson et al. | 350/96.15 |
| 4,846,542 | 7/1989 | Okayama et al. | 350/96.15 |
| 4,859,022 | 8/1989 | Opdahl et al. | 385/21 |
| 4,903,029 | 2/1990 | Newberg et al. | 342/172 |
| 5,009,477 | 4/1991 | Alferness et al. | 385/17 |
| 5,101,455 | 3/1992 | Goutzoulis | 385/24 |
| 5,103,495 | 4/1992 | Goutzoulis | 385/15 |
| 5,109,449 | 4/1992 | Newberg et al. | 385/46 |
| 5,125,051 | 6/1992 | Goutzoulis et al. | 385/27 |
| 5,233,453 | 8/1993 | Sivarajan et al. | 359/117 |
| 5,253,310 | 10/1993 | Delbare et al. | 385/14 |

OTHER PUBLICATIONS

*Switched Optical Delay-Line Signal Processors*, R. Ian MacDonald Published in *Journal of Lightwave Technology*, vol. LT-5 No. 6, Jun. 1987.

Primary Examiner—Frank Gonzalez
Attorney, Agent, or Firm—Mary Y. Redman

[57] ABSTRACT

An optical time delay device includes a switching component butt-coupled to one or two delay line components. The switching component is a planar substrate with an optical waveguide switching array formed thereon. The delay line component is a second planar substrate with a plurality of optical waveguides of different optical lengths. The input ends and output ends of the waveguides are disposed along the butt-coupled edge of the second substrate. The waveguides and switches are arranged so that the switches direct an incoming optical signal to a selected one or more of said waveguides. In a preferred embodiment, one of the waveguides has an optical length ΔL, and the remaining waveguides have optical lengths which are multiples of ΔL. The use of planar substrates with electro-optic and passive waveguide circuits allows for a modular approach, with interchangeable delay line components chosen for a particular application and butt-coupled to the switching component.

16 Claims, 3 Drawing Sheets

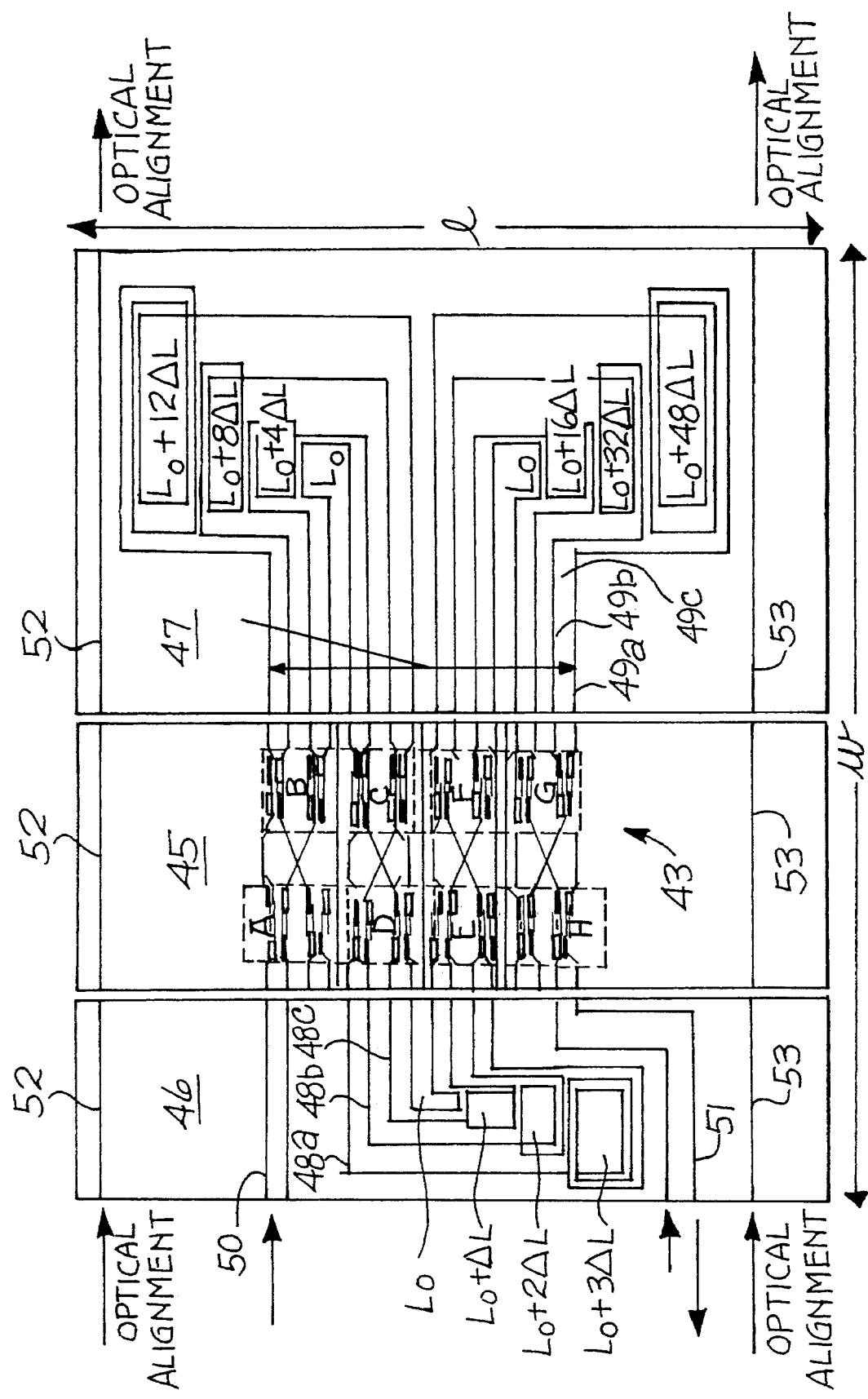

PROGRAMMABLE SIGNAL TIME DELAY DEVICE USING ELECTRO-OPTIC AND PASSIVE WAVEGUIDE CIRCUITS ON PLANAR SUBSTRATES

FIELD OF THE INVENTION

This invention is in the field of photonic devices, and more specifically, in the field of photonic variable time delay devices.

BACKGROUND OF THE INVENTION

Operation of a phased array antenna at EHF (Extremely High Frequencies) provides important communication system advantages compared to lower frequency operation. The shorter wavelengths at EHF means that a desired antenna gain can be provided by proportionately smaller and lighter apertures. Small size is especially important in applications where conformality of the aperture to a non-planar shape is required. Antenna operation at EHF also allows for more bandwidth at a specified fractional bandwidth, and a less crowded spectrum. Wideband operation is particularly desirable for increasing data rates, reducing the probability of intercept, and negating jamming. However, when driven with appreciable fractional bandwidths and wide scan angles, phased arrays suffer unacceptable losses from frequency-dependent beam pointing, or beam squint. For example, an array of 40×40 elements has a gain loss of over 10 dB at a fractional bandwidth of 10 percent. The need for increased bandwidth is unrelenting and will inevitably lead to fractional bandwidth that leads, in turn, to beam squint.

Wide instantaneous bandwidth in high gain arrays will require a true-time-delay (TTD) beam steering approach to avoid the severe scan loss associated with beam squint. Variable time delay (VTD) modules are the key component necessary for implementing TTD beam steering. To practically implement true-time-delay at EHF, the VTD module must be based on a technology that is compatible with low-cost mass producibility, reduced assembly and packaging complexity, as well as being compactly packaged. Switching between different delays must be fast and low loss; delays must be easily and precisely set. Photonics technology offers a practical approach to VTD. The use of photonics brings with it many advantages, including weight and size reduction, EMI immunity, high bandwidth, low loss and negligible dispersion. More important are the advantages of performing signal processing functions such as VTD and phase shifting in the optical domain.

The most common approach to photonic VTD has been an array of electro-optic switches coupled to an array of discrete optical fibers of differing lengths. This approach has serious drawbacks. When the signal is in the very high millimeter wave range, the required delay line can be very short, in the submillimeter to centimeter range. It is not practical to make optical fiber delay lines which are this short, since it is difficult to precisely control fiber length.

Insertion losses are another drawback of fiber optic delay lines. Typical single-mode optical waveguides in Lithium Niobate and glass fiber are between three and nine microns in diameter. To achieve acceptably low coupling loss, alignment between the centers of a waveguide and the optical fiber must be achieved to a tolerance of much less than one micron. This condition is difficult to meet and maintain in any reasonably practical manner.

Fiber optic delay lines are further problematic in that the minimum bending radius is large, usually on the order of a few centimeters, and the required spacing between adjacent fibers is at least 125 microns. These factors combine to pose serious constraints in packing density and increased waveguide bending loss.

Manufacture of a VTD device using optical fiber delay lines presents formidable obstacles. In a typical device, many delay lines must be coupled to waveguides at both ends of the fiber. Each end of each fiber must be individually aligned in a silicon v-groove. This is both time consuming and expensive. The alignment of the fibers in the v-grooves is complicated by the fact that the fiber required for use with typical electro-optic switches is single polarization maintaining fiber. The polarization of the fiber must be maintained in the proper orientation in the v-groove. Failure to do so results not only in unacceptable losses loss but also in crosstalk. It will be readily seen that mass production of fiber optic VTD devices at reasonable cost is nearly impossible as a practical matter.

Another VTD technique uses dispersive fibers and a wavelength-tunable laser source. In addition to the difficulties presented by the use of fibers as discussed above, this technique requires a laser which can overcome challenges of high cost, insufficient wavelength tuning speed, low laser power, laser nonuniformity and wavelength instability. This presents a formidable difficulty. In addition, the multi-picosecond dispersion of the signal across a bandwidth of a few gigahertz can be unacceptable at the 22 ps period of 44 GHz. Finally, packaging of long lengths (hundreds of meters) of dispersive fiber is bulky, tedious, and expensive.

It is apparent that a more easily manufacturable, lower-cost approach to photonic VTD is needed. Likewise, a VTD module with reduced size and weight, which provide fast, low loss switching between different delay lengths that are easily and precisely set, is needed.

SUMMARY OF THE INVENTION

The present invention is an optical time delay device which includes a waveguide switch array component on first planar substrate butt-coupled to a waveguide delay line component on a second planar substrate. The first substrate has an optical switching array comprising integrated optical waveguide switches. The second substrate has formed thereon a plurality of optical waveguides of different optical lengths. The input ends and output ends of the waveguides are disposed along the butt-coupled edge of the second substrate. The waveguides and switches are arranged so that the switches direct an incoming optical signal to a selected one or more of said waveguides. Using planar waveguide technology, a much denser and thus more compact waveguide circuit can be achieved than by using optical fibers. Planar waveguide technology allows a much smaller waveguide-to-waveguide spacing than that which can be achieved using optical fibers; it also allows low loss small-bend radius waveguide bends, which facilitate denser packaging density. Furthermore, planar optical waveguides can cross each other with very low loss (This particular feature cannot be achieved with optical fibers). Unlike an optical fiber array, the entire planar waveguide circuits can be fabricated at the same time using standard semiconductor micro-fabrication technique. Precise waveguide positions are also defined by standard photolithographic technique. In one embodiment, there is a third substrate butt-coupled to the first substrate along the edge opposite the second substrate, with a second plurality of optical waveguides of different optical lengths formed thereon with their input ends and output ends being disposed along the butt-coupled edge of the third substrate. In this embodiment, the integrated optical switches are disposed between the first and said second set of waveguides. In a preferred embodiment, one of the waveguides has an optical length ΔL, and the remaining waveguides have optical lengths which are typically integer multiples of ΔL.

The substrate on which the switch array is formed is preferably a material with an efficient electro-optic effect, such as LiNbO$_3$, with the integrated electro-optic switches formed by a process such as titanium indiffusion or proton exchange optical waveguide techniques. The substrates with waveguide delay lines are preferably materials suitable for low propagation loss, long delay lines, such as silica waveguides fabricated on silicon substrate. The use of these planar substrates and integrated optics provides time delay devices which are compact, easily fabricated and highly reliable. Waveguides can be fabricated and the entire waveguide patterns can be precisely defined by standard photolithographic techniques, which assures the proper alignment of waveguides in the butt-coupled substrates, since the correct relative placement of waveguides is assured by this fabrication technique.

The present invention allows a modular approach to VTD assembly. The switch array component and the delay line component can be optimized individually. Delay line components of differing length configurations can be interchangeably coupled to a given switch array as desired, since they can be fabricated as independent modules. Thus, the devices of the present invention is well-suited to mass-production and yet still is quickly and easily adapted for particular applications.

BRIEF DESCRIPTION OF THE DRAWINGS

FIG. 3 is a schematic representation of a third embodiment of the invention, having a hybrid architecture.

DETAILED DESCRIPTION OF THE DRAWINGS

Figure 1:
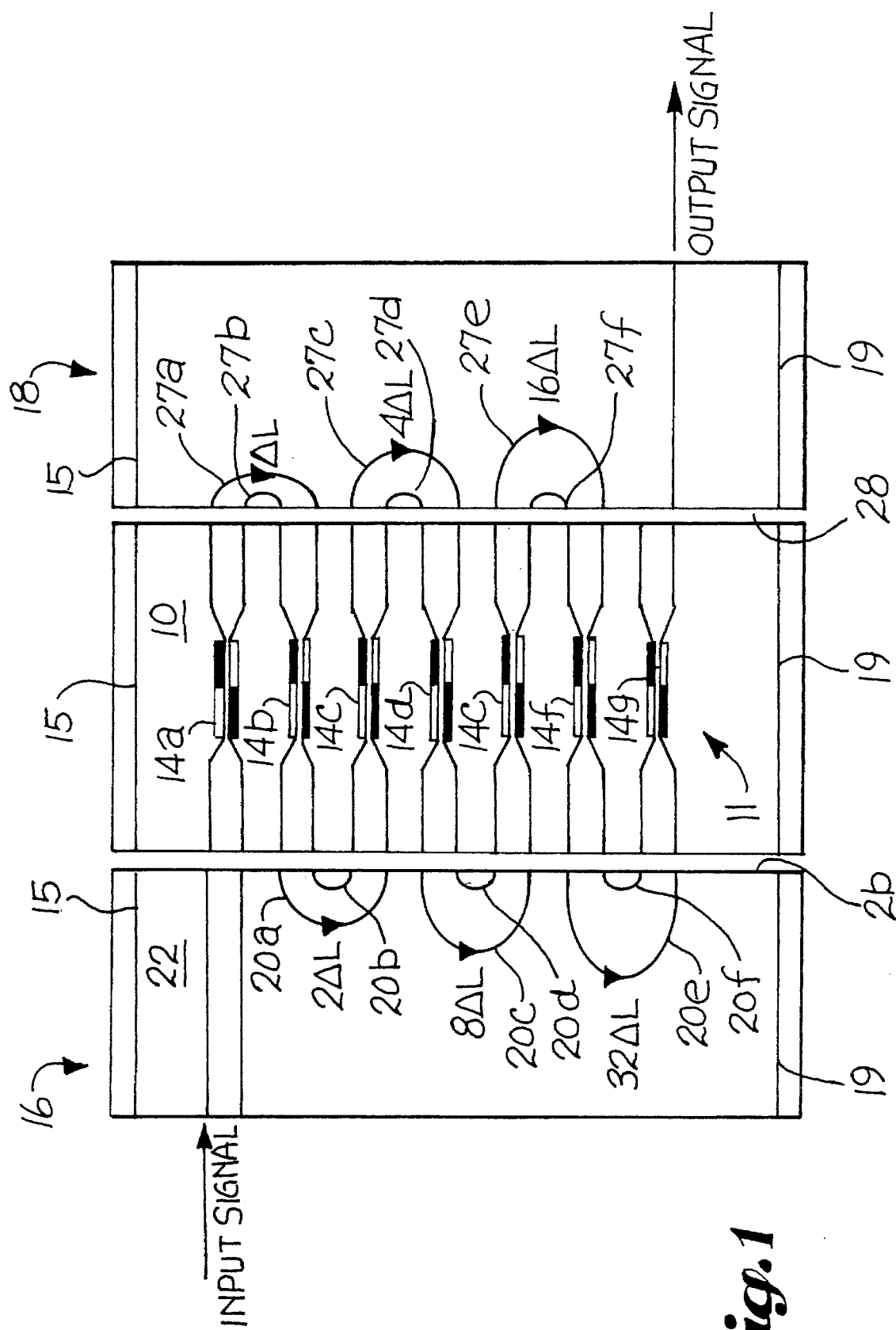
FIG. 1 is a schematic representation of a first embodiment of the invention, having a serial architecture.

Referring to FIG. 1, a first embodiment of the invention includes a first substrate 10 having an array of electro-optic switches 14a, 14b . . . 14g formed thereon. This first substrate 10 with switches 14a, 14b . . . 14g is preferably formed as an integrated optic switch circuit 11 fabricated on an electro-optic substrate. Preferably, the substrate material will be one which has low optical waveguide propagation loss, high electro-optic efficiency, and an optical waveguide mode size that is easily matched to the mode size of the other optical waveguide substrates which are discussed below. Lithium Niobate (LiNbO$_3$) is very well-suited to this application insofar as it exhibits these properties and also is easy to work with in the fabrication processes used to manufacture the device. Lithium tantalate is another example of a material suitable for use in the present invention.

Each switch 14a, 14b . . . 14g is preferably an electro-optic 2×2 directional coupler waveguide switch. Use of a material like LiNbO$_3$ allows for the use of highly efficient, very high speed (GHz) and low cross talk (less than −30 dB) 2×2 waveguide switches. Such a switch is described in the Springer-Verlag Series on Electronics and Photonics, Volume 26, "GuidedWave Optoelectronics," (T. Tamir, editor) which is incorporated herein by reference. The switches may be fabricated by well-known processes such as titanium indiffusion or proton exchange. Input and output waveguides for each switch are provided as shown.

In the embodiment of FIG. 1, the substrate 10 and switch circuit 11 butt-couples on opposite sides to a pair of delay line components 16, 18. Delay line component 16 includes a substrate 22 having a plurality of waveguides 20a, 20b . . . 20f of differing optical lengths formed thereon. Any material on which low loss optical waveguides can be used for this substrate 22. Preferably, the material will allow for very low loss waveguides having small bend radii and precise optical path length. The waveguide mode should match well that of the first substrate. Silica waveguides fabricated on a silicon substrate have these properties. Thus, in a preferred embodiment, waveguides 20a . . . 20f on the substrate 22 are passive, low loss optical waveguides, such as silica waveguides on silicon wafer.

The waveguides 20a . . . 20f on substrate 22 have each of their two ends disposed on the edge 26, which is butt-coupled to the switch circuit 11. The delay line component 18, likewise includes a plurality of waveguides 27a, . . . 27f of differing optical lengths having their ends disposed on the edge 28 which is butt-coupled to the switch circuit 11 on the edge opposite the first delay liner component 16. Proper alignment of the butt-coupled substrates can be assured by the provision on each substrate of an alignment waveguide 15 positioned to be collinear when the substrates are properly aligned. A second set of alignment waveguides 19 can also be provided, preferably on an opposite side of the substrates, to serve as a double check on alignment.

The waveguide delay lines and switches in this embodiment are arranged so that the two outputs from each switch are linked to the two inputs of the next switch via two waveguides of different optical path lengths. It is preferable to have the net optical path length differences vary in sequence by a multiple of the basic differential delay length, ΔL, which is chosen so as to achieve the desired time delay resolution. With path length differences of ΔL, 2ΔL, 4ΔL, . . . 32 ΔL, as shown in FIG. 1, the net optical path length can be set to any value NΔL, where N is an integer between 0 and 63, by opening and closing the appropriate choice of switches through the selective application of voltages to desired switches. Although N is an integer in the illustrated embodiment, it need not be so. By providing a greater (or lesser) number of switches and waveguides, a greater (or smaller) range of possible delay times can be achieved. Also, the lengths of the delay lines can be varied as needed for a particular application. The key advantage of this serial architecture is the large number of discrete time delays that can be chosen with a small number of switches.

Figure 2:
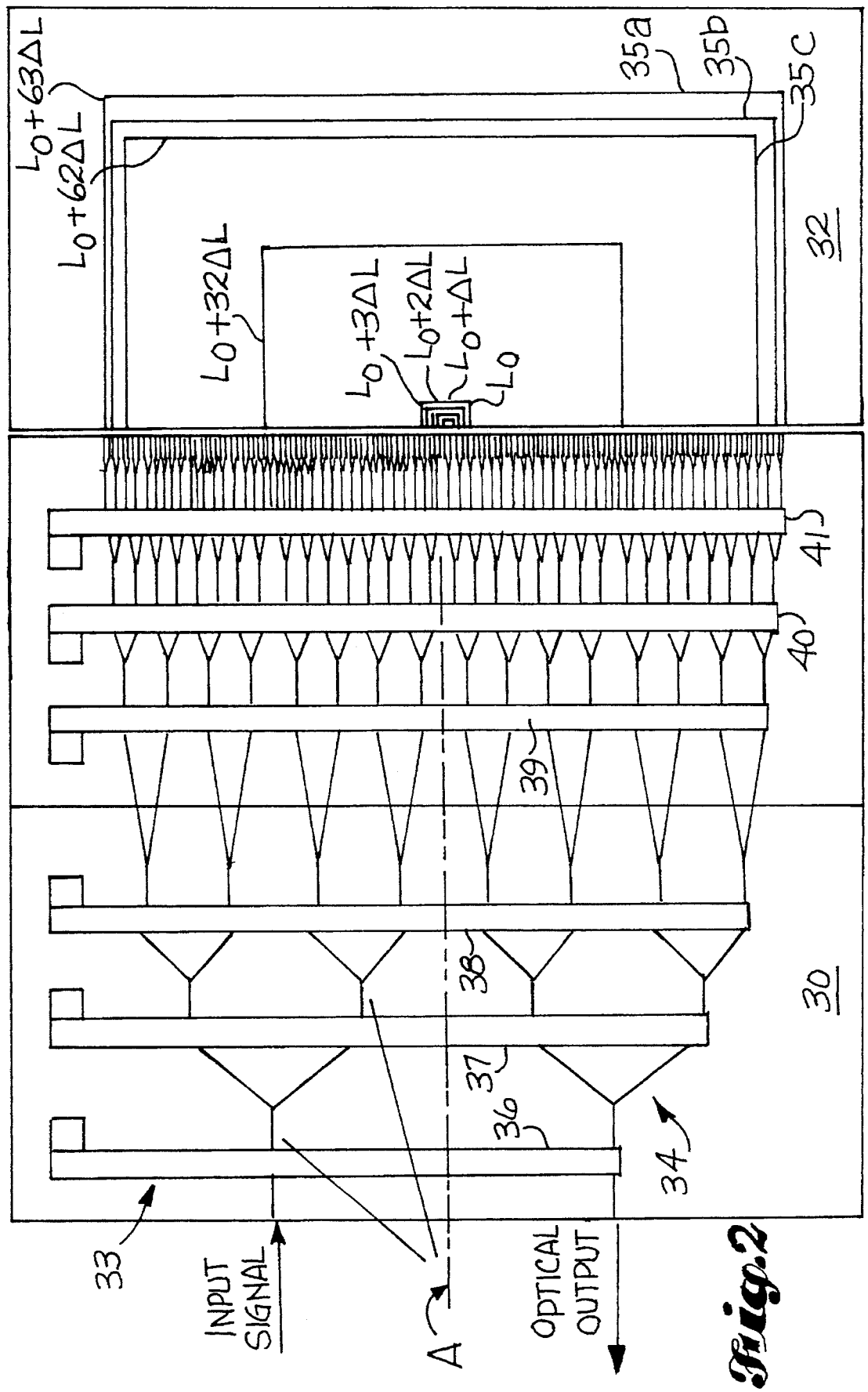
FIG. 2 is a schematic representation of a second embodiment of the invention, having a parallel architecture.

FIG. 2. shows a second embodiment of the invention. For illustration purposes, a 6-bit true time delay device is shown. In this embodiment, a first substrate 30 is butt-coupled to a second substrate 32. The first substrate 30 is preferably a material such as LiNbO$_3$ on which a switch array is provided. The second substrate 32 is preferably a material such as silicon on which silica delay line waveguides 35a, b, c, . . . are formed. As in the FIG. 1 embodiment, it is preferable to have the optical path lengths of the waveguides to vary in sequence by a multiple of the basic differential delay length, ΔL. Two 1×64 optical switch arrays are used: an input network 33 for the optical input to the silica delay lines (of which only seven are shown for clarity) and an output network 34 for the output. Phantom line A delineates the input switch array and output switch array.

In the illustrated embodiment, an input optical signal can be routed to any one of 64 delay lines through the input switch network 33, and the output of that delay line can then be routed back to the output fiber through the output switch array 34. With the switches arranged in columns as shown in FIG. 2, only one switch is used at any one time in any column. Because of this, the electrical complexity is greatly reduced by connecting each column of switches to a common electrode 36, 37, 38, 39, 40, or 41. Only 6 switching voltages are then needed to obtain any of 64 time delays. Another advantage of this parallel approach is that only two LiNbO$_3$/silica waveguide interfaces are encountered for any time delay by an optical signal traveling from the input to the output.

FIG. 3 shows a third embodiment, which combines features of the series and parallel embodiments. This embodiment includes a LiNbO$_3$ substrate 45 with a switching array 43 composed of four 4×4 switching matrices thereon. Each matrix includes four interconnected 2×2 switches. This substrate 45 is butt-coupled along opposite edges to two silicon substrates 46, 47 with waveguide delay lines 48a, 48b, 48c, . . . and 49a, 49b, 49c, . . . , respectively, thereon. This embodiment uses a simpler switch array than the parallel approach of FIG. 2. Also, fewer LiNbO$_3$/silica waveguide interfaces are encountered by a signal traveling through this device than the serial approach of FIG. 1. The net optical throughput loss of this embodiment is therefore advantageously low.

In this embodiment, an optical signal is input to the input waveguide 50 on the first delay line substrate 46. It enters the switching array 43, which directs it to one of the delay lines 49a, 49b, 49c . . . , on the second delay line substrate 47, back through the switch array 43 to one of the delay lines on the first substrate 46, or to the output waveguide 51. A pair of alignment waveguides 52, 53 are provided, similar to those in the FIG. 1 embodiment.

Silica waveguides can cross one another, can be made with very small bending radii, on the order of 5mm, and can be spaced less than 50 microns apart. Thus, the delay device of the invention can be made quite compact. The embodiment of FIG. 3, for example, can be fabricated with outside dimensions of about 2 centimeters length by 10 centimeters width ("l" and "w" in FIG. 3, which is not to scale). Using precise photolithographic techniques and since all the waveguides are fabricated on planar substrates, all the waveguide are automatically aligned on the same plane. Precise alignment of the entire array of delay line waveguides and the switches can thus be assured. Appropriate anti-reflection coatings such as yttrium oxide can be placed on the input and output edges of the substrates. To minimize mode mismatch, the cross section of the waveguides can be tailored to match the profile of the LiNbO$_3$ waveguides which input or output signals to or from the switches. The coating and the mode matching reduce losses at the substrate interfaces.

The invention lends itself to a modular approach for adapting the device to specific applications. In any of the illustrated embodiments, each component substrate can be independently optimized and treated as interchangeable modules. Thus, one could choose from a collection of delay line components of differing configurations to easily assemble a device tailored for a particular need.

It will be understood that the embodiments described above are merely illustrative and that persons skilled in the art may make many variations and modifications, including combinations of various features of the illustrated embodiments, without departing from the spirit and scope of the invention. All such modifications and variations are intended to be within the scope of the invention as defined in the appended claims.

What is claimed is:

1. An optical time delay device comprising:

a switching component comprising a first planar substrate, with an optical waveguide switching array comprising integrated optical switches formed on said first substrate;

a delay line component comprising a second planar substrate butt-coupled to said first substrate with a plurality of optical waveguides of different optical lengths formed on said second substrate;

the input ends and output ends of said waveguides being disposed along the edge of said second substrate which is butt-coupled to said first substrate;

said switching array being coupled to said input ends and output ends of said plurality of waveguides so as to direct an optical signal through a selected one or more of said waveguides.

2. The device of claim 1 wherein said first substrate comprises an electro-optic material.

3. The device of claim 2 wherein said delay line component comprises a substrate on which low loss optical waveguides are formed.

4. The device of claim 3 wherein said switching array comprises means for applying a controlled amount of voltage to selected switches in said switching array so as to determine the path through said switching array to be taken by said signal.

5. The device of claim 4 further comprising:

a second delay line component comprising a third substrate with a second plurality of optical waveguides of different optical lengths formed thereon, said third substrate being butt-coupled to said first substrate along the edge opposite that butt-coupled to said second substrate;

the input ends and output ends of said waveguides being disposed along the edge of said third substrate which is butt-coupled to said first substrate;

and wherein said switching array is disposed between said first and said second plurality of waveguides.

6. The device of claim 4 wherein one of said waveguides has an optical length $\Delta L$, and each of the remainder of said waveguides has an optical length which is an integral multiple of $\Delta L$.

7. The device of claim 5 wherein one of said waveguides has an optical length $\Delta L$, and each of the remainder of said waveguides has an optical length which is an integral multiple of $\Delta L$.

8. The device of claim 3 wherein said first substrate comprises a LiNbO$_3$ substrate and said second substrate comprises a silicon substrate and said waveguides comprise silica waveguides.

9. The device of claim 4 further comprising an anti-reflective coating on said second substrate along the edge which is butt-coupled to said first substrate.

10. The device of claim 5 further comprising an anti-reflective coating on said second substrate along the edges which are butt-coupled to said first and said second substrates.

11. The device of claim 8 wherein said switches are formed by titanium indiffusion.

12. The device of claim 8 wherein said switches are formed by proton exchange.

13. The device of claim 1 wherein said switching component and said delay line component are fabricated by photolithography, whereby alignment of waveguides in the switching array component and the delay line component is facilitated.

14. The device of claim 3 wherein said switching array and said delay line waveguides are fabricated so as to be co-planar when said first substrate and said second substrate are butt-coupled.

15. The device of claim 3 wherein the distances between adjacent waveguides is less than 50 microns.

16. The device of claim 3 further comprising waveguides with small bend radii.

* * * * *